3,167,592
PREPARATION OF PERFLUOROALKANES
Murray Hauptschein, Glenside, and Arnold H. Fainberg, Elkins Park, Pa., assignors to Pennsalt Chemicals Corporation, Philadelphia, Pa., a corporation of Pennsylvania
No Drawing. Filed Aug. 15, 1961, Ser. No. 131,500
10 Claims. (Cl. 260—653)

This invention relates to the preparation of perfluorinated alkanes by the catalytic pyrolysis of corresponding perfluorinated alkenes, and is particularly concerned with the preparation of perfluoropropane $C_3F_8$ by the catalytic pyrolysis of perfluoropropene $C_3F_6$ Completely fluorinated alkanes having from 3 to 6 carbon atoms are a valuable class of compounds characterized by an extraordinary degree of chemical and thermal stability and excellent dielectric properties. Because of their higher vapor density the $C_3$ to $C_6$ perfluoroalkanes are much superior to $CF_4$ and $C_2F_6$ for most dielectric uses. Perfluoropropane, having a boiling point of about —40° C. is particularly useful as a gaseous dielectric for outdoor uses since along with a relatively higher vapor density, it will not condense in the coldest weather encountered in most areas. These materials are also useful as heat transfer fluids, hydraulic fluids and the like particularly in environments where a high degree of chemical inertness and thermal stability are of importance.

At the present time, the commercial application of such materials for these and other uses has been limited by the lack of economical methods for their preparation. Although a variety of methods have been suggested, such as the direct fluorination of hydrocarbons with elemental fluorine or the reaction of carbon with elemental fluorine, or of carbon with metal halides at extremely high temperatures, these methods are expensive to operate and generally do not produce the desired products in good yields.

In accordance with this invention, a method has now been found for preparing perfluorinated alkanes having from 3 to 6 carbon atoms in good yields and conversions by the catalytic pyrolysis of the corresponding perfluoroolefin. Briefly stated, this new process involves contacting a terminal perfluoro-olefin of the formula $R_fCF=CF_2$, where $R_f$ is a perfluoroalkyl radical having from 1 to 4 carbon atoms, with an aluminum fluoride catalyst at a temperature of from 400 to 900° C. and preferably 500° to 800°C. Suitable perfluoro-olefins include e.g.

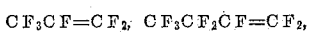
$CF_3CF=CF_2$, $CF_3CF_2CF=CF_2$,

$CF_3—\overset{CF_3}{\underset{|}{C}}=CF_2$, $CF_3CF_2CF_2CF=CF_2$ etc.

Although the mechanism by which the perfluoroalkene is converted into a corresponding perfluoroalkane has not been ascertained with certainty (it being understood that the invention does not depend upon any particular reaction mechanism), it is considered possible that the reaction involves the following stoichiometry:

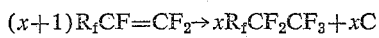
$(x+1)R_fCF=CF_2 \rightarrow xR_fCF_2CF_3+xC$ where $x$ is the number of carbon atoms in the starting olefin. The deposition of free carbon on the catalyst in the course of the reaction lends support to the above.

The preferred aluminum fluoride catalysts useful in carrying out the invention are those prepared by the fluorination of activated alumina. With catalysts prepared in this manner it is not necessary that the fluorination of the alumina be carried to completion, and accordingly such catalysts may contain, in addition to aluminum and fluorine, some oxygen, and it is accordingly understood that the term "aluminum fluoride catalyst" as used herein is intended to include catalysts of this type as well as those consisting essentially of pure $AlF_3$ Particularly preferred are catalysts prepared by fluorinating activated alumina by treatment at an elevated temperature with a lower fluorocarbon in the manner described hereinafter. In an alternative procedure, alumina may be fluorinated either partially or completely by treatment with hydrogen fluoride at temperatures of e.g. from 200° to 600 °C. The exact manner in which the fluorine, aluminum and residual oxygen are associated in catalysts prepared in this manner is not known.

Aluminum fluorides obtained by procedures other than the fluorination of alumina are also suitable as catalysts in the invention. Thus, essentially pure $AlF_3$, as such, or supported on an essentially inert non-siliceous carrier, such as corundum (alpha alumina) or fused beryllia or thoria, may be used. $AlF_3$ of sub-microscopic crystallite size prepared e.g. by treating anhydrous $AlCl_3$ with anhydrous HF as described in U.S. Patent 2,676,996 is generally preferred to conventional aluminum fluorides of relatively large crystal size.

As stated above, the catalytic conversion of the olefin to the corresponding alkane proceeds at temperatures from about 400° to 900° C. At temperatures below 400° C. the reaction does not proceed at an appreciable rate, while above 900° C. catalyst life is shortened and yield losses due to side reactions and thermal degradation are increased. Temperatures from about 500° C. to 800° C. are preferred for a maximum catalyst life and maximum yields and conversions of the desired perfluorinated alkanes.

Preferably, the catalytic pyrolysis is carried out by continuously passing the olefin through a heated zone containing the catalyst. Conveniently, the heated zone may be in the form of a hot tube containing the catalyst heated to the desired temperature by electrical means or any other desired heating means. The tube should be constructed of materials resistant to attack by the reactants or reaction products at the operating temperatures. Preferred materials of this type include, for example, platinum lined tubes, nickel tubes, Monel metal tubes and the like.

Reaction pressure is most conveniently atmospheric although subatmospheric or superatmospheric pressures (ranging e.g. from 10 mm. Hg absolute to 100 lbs./in.$^2$ gage) may also be used. Contact time (residence time in the catalyst bed) is preferably relatively short, e.g. of the order of a fraction of second up to about a minute.

In the catalytic pyrolysis reaction of the invention, the precursor olefin $R_fCF=CF_2$ is converted into the corresponding alkane $R_fCF_2CF_3$ in good yields. Minor amounts of other products may also be produced such as $CF_4$, $C_2F_6$ and perfluorinated olefins different from the starting olefin. Unconverted olefin may, after separation from the perfluoroalkane product, be recycled to the reaction. Carbon, which is also produced as a product of the reaction will deposit upon the catalyst. Should the activity of the catalyst decline after a period of operation because of the accumulation of excessive carbon deposits, its activity can be restored by a relatively simple regeneration procedure involving the passage of oxygen or oxygen containing gases (e.g. air) over the catalyst at temperatures e.g. from 400° to 600° C. This results in the oxidation of the deposited carbon restoring the activity of the catalyst. Excessive temperatures should be avoided during the regeneration procedures so as to avoid damaging the catalyst.

The invention is particularly advantageous for the production of perfluoropropane from perfluoropropene. Perfluoropropene can be produced economically in high yields from fluoroform as described in copending application Serial No. 7,128, filed February 8, 1960 of Murray Hauptschein and Arnold Fainberg, now United States Patent 3,009,966 issued November 21, 1961 and accordingly the present invention provides a method for producing perfluoropropane in good yield from a relatively inexpensive starting material.

PREPARATION OF PREFERRED CATALYSTS

As pointed out above, the most highly preferred catalysts are those prepared by treating activated alumina with a lower fluorocarbon (i.e. a relatively low molecular weight fluorine containing carbon compound). This treatment is carried out by contacting activated alumina with the fluorocarbon in the vapor phase at an elevated temperature at which reaction occurs between the alumina and the fluorocarbon with the evolution of carbon oxides.

Fluorocarbons that may be used to effect the fluorination of the activated alumina may in general be any relatively low molecular weight fluorine containing carbon compound, containing not more than one hydrogen atom and generally containing not more than 8 carbon atoms and preferably of the order of from 1 to 4 carbon atoms. Preferred fluorocarbons are those which in addition to carbon and fluorine contain only elements selected from the class consisting of chlorine and hydrogen, particularly fluoroalkanes of this type. Thus, included in this group are perfluorocarbons (i.e. containing only fluorine and carbon), perfluorochlorocarbons (i.e. containing only carbon, fluorine and chlorine); perfluorohydrocarbons (i.e. containing only carbon, fluorine and hydrogen) and perfluorochlorohydrocarbons (i.e. containing only carbon, fluorine, chlorine and hydrogen); provided always that not more than 1 hydrogen atom is present in the molecule. Typical examples of fluorocarbons suitable for the fluorination of activated alumina to produce the catalyst useful in the invention are $CF_2ClCFCl_2$; $CF_3CCl_3$; $CF_2ClCF_2Cl$; $CF_3CFCl_2$; $CFCl_2CFCl_2$; $CF_2Cl_2$; $CF_3Cl$; $CFCl_3$; $CF_2HCl$; $CHF_3$; $CF_3CF=CF_2$; $CF_3CF_2CF=CF_2$;

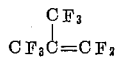

and the like.

In general, any of the many available activated aluminas may be employed to prepare the preferred catalyst. Activated alumina, as is well recognized in the art, is characterized by its relatively high surface area as distinguished from non-activated forms such as corundum or alpha alumina which are dense, low surface materials. Typically, activated aluminas may have surface areas ranging e.g. from 10 to 300 meters$^2$ per gram. Desirably, before the fluorination of the alumina by treatment with the fluorocarbon, the alumina is first dried to remove adsorbed moisture. This may be accomplished by heating the activated alumina to a temperature of e.g. 300° C. to 600° C. and preferably 350° to 550° C. for sufficient time to insure the elimination of any free water, e.g. 5 minutes to 5 hours. Desirably, during the drying operation the activated alumina is swept with a stream of an inert gas such as nitrogen.

The treatment of the activated alumina with the fluorocarbon is carried out at elevated temperatures usually ranging from about 150° C. to 900° C. and preferably 300° C. to 700° C. An exothermic reaction occurs between the alumina and the fluorocarbon as evidenced by a rise in the temperature of the catalyst bed. The minimum temperature at which such a reaction may be initiated will vary depending upon the fluorocarbon employed. Reaction may be initiated at temperatures as low as 150° C. with materials such as $CF_2HCl$ whereas, with materials such as $CF_2Cl_2$ or $CF_2ClCFCl_2$, or $CF_3CF=CF_2$, minimum temperatures of 200° C. or higher are generally required to initiate the reaction.

The principal gaseous reaction products during the activation treatment are carbon oxides. These may be in the form of carbon monoxide, carbon dioxide or both and/or in the form of carbon oxide addition products, particularly $COCl_2$ and/or $COClF$. It is understood that the term carbon oxide is intended to include such addition products as well as carbon dioxide and carbon monoxide. Other products such as tetrachloroethylene, chlorine, hexachloroethane, carbon tetrachloride, chloroform and chlorofluoroalkanes may also be produced where the activating fluorocarbon contains chlorine.

The extent to which it is necessary to carry out the fluorination of the alumina to produce a suitable catalyst will depend somewhat on the temperatures at which the catalyst is to be later operated. In general, the fluorination of the alumina should be carried to such a point that when used as a catalyst for the conversion of perfluoroolefin to perfluoroalkane at a given operating temperature, the reactor effluent contains not more than minor amounts (preferably not over 10% by weight) by carbon oxides. Major amounts of carbon oxides in the reactor effluent indicates insufficient fluorination of the alumina. Higher catalyst operating temperatures will generally require a catalyst of a higher degree of fluorination. The time required to complete the fluorination of the alumina with the fluorocarbon will depend upon the fluorination temperature employed, catalyst particle size, the length and other dimensions of the catalyst bed, and other factors. Typically, the fluorination procedure may require from ½ to 20 hours.

To avoid excessive exotherms in the catalyst bed during fluorination it will often be desirable to carry out the fluorination at progressively increasing temperatures. The initial stages of fluorination occur at relatively lower temperatures than the final stages and good control over reaction rate may be achieved by gradually increasing the fluorination temperature as the fluorination proceeds in accordance with the output of carbon oxides in the reactor effluent.

During fluorination, the fluorine derived from the fluorocarbon is apparently "fixed" in the activated alumina which accordingly shows a considerable weight increase during the fluorination procedure. During subsequent use the catalyst may continue to show a gradual weight increase due to further reaction of perfluoroalkene with the unreacted alumina.

If desired the same perfluoro-olefin that is to be converted into the corresponding perfluoroalkane may be used to prepare the fluorinated alumina catalyst. For example when activated alumina is treated with perfluoropropene at elevated temperatures the first products obtained are carbon oxides, produced concurrently with the fluorination of the alumina. When the fluorination proceeds to a certain point, the output of carbon oxide falls to a low level and the major product becomes the desired alkane, viz $C_3F_8$.

*Example A—Preparation of fluorinated alumina catalyst*

An activated alumina was employed in the form of ⅛″ x ⅛″ cylindrical pellets containing over 99% ($H_2O$ free basis) of alumina and low in sodium, iron and silica (0.03% $Na_2O$; 0.08% $Fe_2O_3$; 0.22% $SiO_2$). Before drying it has a 26% weight loss on ignition at 1000° C. and a surface area of 231 square meters per gram.

The center portion (about 15″ in length) of a Monel metal tube having an inside diameter of 15/16″ is packed with 170 grams (about 160 milliliters volume) of the above activated alumina. The catalyst is heated to 500° C. for 1 hour while sweeping with nitrogen to drive off an estimated 10% by weight of water.

After drying the catalyst in this manner, perfluoropropene is passed through the tube while the alumina is maintained at a temperature of 300° C. at a space velocity of 55 volumes of $C_3F_6$ (at standard conditions of temperature and pressure) per hour per volume of alumina for a period of 1.4 hours. A vigorous reaction occurs in which considerable heat is evolved. During the first 15 minutes the only gases emerging from the tube are CO and $CO_2$, following which increasing amounts of unreacted perfluoropropene together with CO and $CO_2$ is present in the exit gases. After 1.4 hours the temperature of the reactor is raised to 400° C. and the rate of flow of $C_3F_6$ is increased from 2 to 4 times. During the next hour, during which time considerable heat is evolved, CO and $CO_2$ are obtained as the major products. The $C_3F_6$ flow rate is then cut back to the initial rate and the treatment is continued for four additional hours at 400° C. The evolution of CO and $CO_2$ gradually declines during this period and at the end of this time other products including $CF_4$, $C_2F_6$ and perfluoroisobutylene appear in the reactor off gases. The temperature is then raised to 600° C. causing a large initial burst of CO and $CO_2$ in the off gases. After approximately one hour at 600° C. the concentration of CO and $CO_2$ in the off gases declines to about 1% by weight of the total exit gases. At this point, the catalyst contains of the order of 50% fluorine by weight and is ready for use in the conversion of perfluoroalkenes to perfluoroalkanes.

*Example B—Preparation of fluorinated alumina catalyst*

Activated alumina in the form of pellets ⅛" x ⅛" in size and of the type used in Example A is placed in an electrically heated tube and dried by heating to a temperature of 500° C. while sweeping with nitrogen for about one hour with a loss of about 10% by weight of water.

After drying, the bed of alumina pellets is adjusted to a temperature of 300° C. after which $CF_2ClCFCl_2$ vapors are passed through the bed at a space velocity of about 200 volumes of $CF_2ClCFCl_2$ vapor (at standard conditions of temperature and pressure) per hour per volume of bed for a period of about 1 hour. A hot zone, approximately 50° hotter than the average bed temperature forms at the inlet end of the bed initially and then moves progressively down the bed toward the exit end as the fluorination treatment proceeds. During this treatment the principal products are a mixture of carbon dioxide and carbon monoxide with smaller amounts of tetrachloroethylene. After about 1 hour the evolution of carbon oxides ceases simultaneously with the appearance of the hot zone at the exit end of the bed. The temperature of the bed is then raised to about 550° C. and the treatment with $CF_2ClCFCl_2$ is continued. A hot zone is again formed initially at the inlet end of the bed which gradually moves toward the exit end. The evolution of carbon oxides continues until the hot zone reaches the exit end of the bed and thereupon ceases abruptly. During the entire treatment, the activated alumina increases in weight by about 45%.

*Example 1—Preparation of perfluoropropane from perfluoropropene*

A fluorinated alumina catalyst prepared as described in Example A contained in a Monel metal tube having an inside diameter of 15/16" is employed for the conversion of perfluoropropene to perfluoropropane. While maintaining the catalyst temperature at 600° C. perfluoropropene is passed through the tube containing the catalyst at a space velocity of 55 volumes of perfluoropropene (at standard conditions of temperature and pressure) per hour per volume of catalyst for a period of three hours. The major product during this time is $C_3F_8$. The catalyst temperature is then raised to 650° C. and perfluoropropene is passed through the tube for an additional hour. The reactor exit gases are led to a Dry-Ice cooled receiver where the total product is collected. Total product analyses are carried out using vapor fractometer and infrared techniques. The composition of the product gases at a catalyst temperature of 650° C. is as follows:

| Compound | Mole percent | Weight percent |
|---|---|---|
| CO | 6.3 | 1.1 |
| $CO_2$ | 2.0 | 0.6 |
| $CF_4$ | 7.4 | 4.1 |
| $C_2F_6$ | 2.1 | 1.9 |
| $C_3F_8$ | 41.3 | 49.7 |
| $CF_3CF=CF_2$ | 30.5 | 29.2 |
| Perfluorobutene-2 (trans-isomer) | 2.7 | 3.5 |
| Perfluorobutene-2 (cis-isomer) | 1.6 | 2.0 |
| Perfluoroisobutylene | 5.0 | 6.4 |
| Unknowns | 1.2 | 1.5 |

Assuming the reaction stoichiometry to be:

$$4C_3F_6 \rightarrow 3C_3F_8 + 3C$$

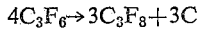

$C_3F_6$ is converted to $C_3F_8$ in a conversion of 50% per pass through the reactor and in a yield of 70%.

The catalyst recovered from this reaction is jet black as the result of deposited carbon. Analysis of the recovered catalyst shows 8% carbon, 0.25% hydrogen, 0.22% $H_2O$ and 54.6% fluorine.

*Example 2—Conversion of perfluoropropene to perfluoropropane*

Using a catalyst prepared as described in Example B, contained in a 1" Monel metal tube, perfluoropropene is converted to perfluoropropane by passing over the catalyst at a catalyst operating temperature of 625° C. and at a space velocity of 100 volumes of perfluoropropene per volume of catalyst per hour. Perfluoropropane is obtained in approximately the same yields and conversions as in Example 1.

*Example 3—Conversion of perfluorobutene-1 to perfluorobutane*

Perfluorobutene-1 ($CF_3CF_2CF=CF_2$) is passed through a 1" Monel metal tube packed with a catalyst prepared as described in Example B at a space velocity of the order of 60 volumes of perfluorobutene per volume of catalyst per hour and at a catalyst temperature of 650° C. Perfluorobutane $C_4F_{10}$ is obtained in good yields and conversions.

It is to be understood that many other variations and embodiments are included within the scope of the invention in addition to those specifically described above; the embodiments described are for the purpose of illustrating and exemplifying the invention and the invention is not limited thereto.

We claim:
1. A method for converting a perfluoroolefin of the formula $R_fCF=CF_2$ to a corresponding perfluoroalkane of the formula $R_fCF_2CF_3$, where $R_f$ is a perfluoroalkyl radical having from 1 to 4 carbon atoms, which comprises contacting said perfluoroolefin with an aluminum fluoride catalyst at a temperature of 400° C. to 900° C., collecting the effluent from said contacting operation and separating said corresponding perfluoroalkane from said effluent as the major product of the reaction.
2. A method in accordance with claim 1 in which the catalyst temperature is in the range of from 500° C. to 800° C.
3. A method for converting perfluoropropene to perfluoropropane which comprises contacting perfluoropropene with an aluminum fluoride catalyst at a temperature of 400° C. to 900° C. collecting the effluent from said contacting operation and separating perfluoropropane from said effluent as the major product of the reaction.
4. A method in accordance with claim 3 in which the catalyst operating temperature is 500° C. to 800° C.
5. A method for converting perfluoroolefins of the formula $R_fCF=CF_2$ to corresponding perfluoroalkanes of the formula $R_fCF_2CF_3$ which comprises contacting at a temperature of 400° C. to 900° C. said perfluoroolefin with an aluminum fluoride catalyst prepared by the fluorination of activated alumina, collecting the effluent from said contacting operation and separating said corresponding perfluoroalkane from said effluent as the major product of the reaction.

6. A method in accordance with claim 5 in which said catalyst operating temperature is 500° C. to 800° C.

7. A method for converting perfluoroolefins of the formula $R_fCF{=}CF_2$ to corresponding perfluoroalkanes of the formula $R_fCF_2CF_3$ which comprises contacting said perfluoroolefin with an aluminum fluoride catalyst at a temperature of 400° C. to 900° C., said aluminum fluoride catalyst having been prepared by the fluorination of activated alumina with a lower fluorocarbon containing not more than one hydrogen atom, collecting the effluent from said contacting operation and separating said corresponding perfluoroalkane from said effluent as the major product of the reaction.

8. A method in accordance with claim 7 in which said catalyst operating temperature is from 500° C. to 800° C.

9. A method for converting perfluoropropene to perfluoropropane which comprises contacting perfluoropropene with an aluminum fluoride catalyst at a temperature of from 400° C. to 900° C., said aluminum fluoride catalyst having been prepared by the fluorination of activated alumina with a lower fluorocarbon containing not more than 1 hydrogen atom, collecting the effluent from said contacting operation and separating perfluoropropane from said effluent as the major product of the reaction.

10. A method in accordance with claim 9 in which said catalyst operating temperature is in the range of from 500° C. to 800° C.

References Cited in the file of this patent

UNITED STATES PATENTS

| | | |
|---|---|---|
| 2,478,932 | Miller et al. | Aug. 16, 1949 |
| 2,674,630 | Calfee et al. | Aug. 6, 1954 |

FOREIGN PATENTS

| | | |
|---|---|---|
| 555,187 | Canada | Apr. 1, 1958 |